(12) United States Patent
Xu et al.

(10) Patent No.: US 10,244,202 B2
(45) Date of Patent: Mar. 26, 2019

(54) IMAGE PROCESSING METHOD, SYSTEM FOR LASER TV AND THE LASER TV SET THEREOF

(71) Applicant: SHENZHEN SKYWORTH-RGB ELECTRONIC CO., LTD., Shenzhen (CN)

(72) Inventors: Yaoling Xu, Shenzhen (CN); Zhilong Hou, Shenzhen (CN); Jinkui Liang, Shenzhen (CN)

(73) Assignee: SHENZHEN SKYWORTH-RGB ELECTRONIC CO., LTD., Shenzhen (CN)

( * ) Notice: Subject to any disclaimer, the term of this patent is extended or adjusted under 35 U.S.C. 154(b) by 0 days.

(21) Appl. No.: 15/327,737

(22) PCT Filed: Nov. 6, 2015

(86) PCT No.: PCT/CN2015/093959
§ 371 (c)(1),
(2) Date: Jan. 20, 2017

(87) PCT Pub. No.: WO2017/028381
PCT Pub. Date: Feb. 23, 2017

(65) Prior Publication Data
US 2017/0214885 A1 Jul. 27, 2017

(30) Foreign Application Priority Data

Aug. 20, 2015 (CN) .......................... 2015 1 0514565

(51) Int. Cl.
H04N 5/85 (2006.01)
H04N 7/01 (2006.01)
(Continued)

(52) U.S. Cl.
CPC ............. *H04N 7/0125* (2013.01); *G06T 7/11* (2017.01); *H04N 7/015* (2013.01);
(Continued)

(58) Field of Classification Search
CPC ......................................................... H04N 5/74
(Continued)

(56) References Cited

U.S. PATENT DOCUMENTS

2002/0118296 A1 8/2002 Schwab
2007/0058143 A1* 3/2007 Penn .................. G03B 21/2033
353/102
(Continued)

FOREIGN PATENT DOCUMENTS

CN 101764982 A 6/2010
CN 103152540 A 6/2013
(Continued)

OTHER PUBLICATIONS

The World Intellectual Property Organization (WIPO) International Search Report for PCT/CN2015/093959 dated May 18, 2016 p. 1-4.

*Primary Examiner* — Jefferey F Harold
*Assistant Examiner* — Sihar A Karwan
(74) *Attorney, Agent, or Firm* — Anova Law Group, PLLC (57) ABSTRACT

The present invention provides an image processing method, system for laser TV and the laser TV set thereof, which receives a TV signal before converting into ultra high definition images sequences; whose each image is then segmented and converted into two frames of image, and two sequences of image will then be obtained; which are then driven by two DMD driving chips and displayed in a time share and diagonal staggered way during a period satisfying a visual persistence. The present invention utilizes a principle of visual persistence, since two frames of image
(Continued)

segmented from a frame of ultra high definition image may be processed at a same time by two existing DMD driving chips being able to process FHD images, and both frames of image may be displayed at different positions on the screen at different time, forming one frame of ultra high definition image in a human's vision. The present invention owns a simple method, which utilizes an existing FHD element and achieves an ultra high definition display, has a low cost and a wide application.

6 Claims, 5 Drawing Sheets (51) Int. Cl.
H04N 7/015 (2006.01)
G06T 7/11 (2017.01)
H04N 9/31 (2006.01)
G02B 26/08 (2006.01)

(52) U.S. Cl.
CPC ......... *H04N 9/3114* (2013.01); *H04N 9/3129* (2013.01); *H04N 9/3161* (2013.01); *H04N 9/3179* (2013.01); *H04N 9/3188* (2013.01); *G02B 26/0833* (2013.01)

(58) Field of Classification Search
USPC .......................................... 386/353
See application file for complete search history.

(56) References Cited

U.S. PATENT DOCUMENTS

| 2011/0211065 A1* | 9/2011 | Furui | G03B 21/14 |
| | | | 348/135 |
| 2015/0030316 A1* | 1/2015 | Oikawa | H04N 5/7408 |
| | | | 386/353 |

FOREIGN PATENT DOCUMENTS

| CN | 103152541 A | 6/2013 |
| CN | 105120187 A | 2/2015 |
| CN | 104735432 A | 6/2015 |

* cited by examiner

| Receiving and decoding the TV signal; followed by processes of color gamut conversion, gamma correction, image noise reduction and enhancement; then making pixel resolution conversion and frame frequency conversion, generating an ultra-high definition image sequence | H1 |

| With a sampling step of $\sqrt{2}$ pixel, taking pixel sampling to a frame of ultra-high definition image Xi in both horizontal and vertical directions, and obtaining a first frame of image XFi, followed by rearranging the pixels left and obtaining a second frame of image XBi; both the first frame of image XFi and the second frame of image XBi are arranged sequentially, before generating a first sub-image sequence | H2 |

| Segmenting the sub-image vertically, converting the first frame of image XFi and the second frame of image XBi into a first sub-frame of image (XFLi, XFRi) and a second sub-frame of image (XBLi, XBRi), wherein, the XFLi and XFRi are the left half pixels and right half pixels of the first frame of image XFi, the XBLi and XBRi are the left half pixels and right half pixels of the second frame of image XBi; arranging sequentially the first sub-frame of image (XFLi, XFRi) and the second sub-frame of image (XBLi, XBRi) into a sequence, and generating the second sub-image sequence | H3 |

| The DMD driver A and driver B receive and process the first and the second sub-frames of image respectively, then output an image signal to control the micro-mirrors in the DMD chip, and outputting a galvanometer synchronization signal to control the position of the galvanometer as well as outputting a color wheel control signal CW_CTR to make the laser and light processing module provide color lights | H4 |

| The DMD chip receives and processes the COL_S_F signal, turns the corresponding micro-mirrors in the micro-mirror array on the DMD chip on or off, and converts the COL_S_F signal into the image light; when the SF_SYN is at a high voltage, the galvanometer is at the first position, after passing through the spectroscopic/ binocular prism, the galvanometer and lens, the image light is projected to a display screen before displaying the first image. Followed by the DMD chip receiving and processing the COL_S_B signal, turning the corresponding micro-mirrors in the micro-mirror array on the DMD chip on or off, and converting the COL_S_B signal into the image light; when the SF_SYN is at a low voltage, the galvanometer is at the second position, the image light is projected to the display screen before forming the second image | H5 |

| The first and second images formed on screen enter a human's vision sequentially, according to the principle of visual persistence, both the first and the second images will be combined into one ultra-high definition image with a resolution of M*N | H6 |

FIG.4

FIG.5

IMAGE PROCESSING METHOD, SYSTEM FOR LASER TV AND THE LASER TV SET THEREOF

CROSS-REFERENCES TO RELATED APPLICATIONS

This application is a national stage application of PCT Patent Application No. PCT/CN2015/093959, filed on Nov. 6, 2015, which claims priority to Chinese Patent Application No. 2015105145656, filed on Aug. 20, 2015, the content of all of which is incorporated herein by reference.

FIELD OF THE INVENTION

The present invention relates to the field of intelligent TV technology, and, more particularly, to an image processing method, system for laser TV and the laser TV set thereof.

BACKGROUND

A laser TV is a TV adopting a laser as a light source. Comparing to an LCD (Liquid Crystal Display) flat-panel TV, the laser TV owns a plurality of advantages including a better color performance, more energy-saving and environmentally friendly, healthier and more eye-protective. As a brand new TV, it has achieved a high attention from its industry, and owns a great market prospect.

Currently, there are a plurality of optical processing technologies for the laser TV, including DLP (Digital Light Processing), LCOS (Liquid Crystal on Silicon) and LCD. While a DLP technology may better keep a color having no distortion, and it is more environmentally friendly, thus has been widely used. However, currently, a laser TV adopting the DLP technology has a highest implementation resolution of FHD (Full High Definition), since a plurality of its key elements, including a DMD (Digital Micromirror Device) chip, a driving chip and more, are not able to satisfy a requirement of an ultra high definition directly.

Therefore, the current technology needs to be improved and developed.

BRIEF SUMMARY OF THE DISCLOSURE

According to the above described defects, the purpose of the present invention is providing an image processing method, system for laser TV and the laser TV set thereof, in order to solve the problems in the prior art that an existing image processing chip may not satisfy the requirement of an ultra high definition, thus may not display images in ultra high definition.

In order to achieve the above mentioned goals, the technical solution of the present invention to solve the technical problems is as follows:

An image processing method for laser TV, wherein, it comprises:

receiving a TV signal, before converting into an ultra high definition image sequence;

segmenting each frame of image in the sequences of ultra high definition image into two frames of image, and two series of ultra high definition image sequence will then be obtained, a total pixel sum of the two frames of image equals to that of the one frame of ultra high definition image before segmentation;

within a preset time, following an arrangement order of the sequences of ultra high definition image, two DMD driving chips are used to drive each group of the two frames of image in the two sequences of ultra high definition image to be displayed in a time-sharing and diagonal staggered way.

The image processing method for laser TV, wherein, the step of segmenting each frame of image in the sequences of ultra high definition image into two frames of image includes:

with a sampling step of $\sqrt{2}$ pixel, taking a pixel sampling to a frame of image in the sequences of ultra high definition image in both horizontal and vertical directions, before rearranging the image pixels obtained from the pixel sampling following a pixel arrangement order of the ultra high definition image, and obtaining a first frame of image, followed by rearranging the pixels left after sampling, before obtaining a second frame of image, thus the two frames of image are formed.

The image processing method for laser TV, wherein, before obtaining two series of ultra high definition image sequence, it further includes a step of:

segmenting vertically the first frame of image and the second frame of image respectively, before obtaining both left and right half pixels of the first and second frames of image, and, following an arrangement order of pixels in the ultra high definition image, two groups of two frames of image are formed;

following the arrangement order of the sequences of ultra high definition image, two groups of two frames of image formed from each ultra high definition image are arranged into two series of image sequence.

The image processing method for laser TV, wherein, the step of two DMD driving chips applied to driving the two series of ultra high definition image sequence includes:

two DMD driving chips process a received first frame of image respectively, before outputting a first image processing signal, and outputting a galvanometer synchronization signal at a high voltage; followed by processing the received second frame of image respectively, before outputting a second image processing signal, and outputting a galvanometer synchronization signal at a low voltage; at the same time of outputting the first and second image processing signals, a color wheel control signal is output;

the color wheel control signal controls a light processing module to irradiate sequentially a plurality of color lights emitted by itself to a micro-mirror array of the DMD driving chip, the DMD driving chip turns on or off the micro-mirrors in the micro-mirror array according to the first or second image processing signal, before converting the first or second frame of image into an image light, and projecting to a screen for display.

The image processing method for laser TV, wherein, after converting the first or second frame of image into the image light, it further includes:

the image lights are projected onto the screen for display, after passing through a spectroscopic/binocular prism, a galvanometer and a lens in turn;

when the galvanometer synchronization signal is at a high voltage, the galvanometer locates at a first position, and it is the image light corresponding to the first frame of image being projected onto the screen; when the galvanometer synchronization signal is at a low voltage, the galvanometer locates at a second position, and it is the image light corresponding to the second frame of image being projected onto the screen.

The image processing method for laser TV, wherein, after receiving the TV signals, it further includes:

after processing the received TV signals in a turn of signals decoding, color gamut conversion, gamma correction, image noise reduction and enhancement, pixel resolution conversion and frame frequency conversion, the TV signals are converted into an ultra high definition image sequence.

An image processing system for laser TV, wherein, it comprises:

an ultra high definition image sequence generation module, applied to receiving a TV signal, before converting into an ultra high definition image sequence;

an ultra high definition image sequence transforming module, applied to segmenting each frame of image in the sequences of ultra high definition image into two frames of image, and two series of image sequence are then obtained, whose total pixel sum equals to that of the frame of ultra high definition image before segmentation;

an ultra high definition image sequence display module, applied to using two DMD driving chips to drive each group of two frames of image in the two series of image sequence to be displayed in a time-sharing and diagonal staggered way, following the arrangement order of the ultra high definition sequences.

The image processing system for laser TV, wherein, the ultra high definition image sequence transforming module includes:

a sampling and segmentation unit, applied to taking pixel sampling to a frame of ultra high definition image in both horizontal and vertical directions, with a sampling step of $\sqrt{2}$ pixel, and obtaining the first frame of image after rearranging the image pixels obtained from pixels sampling according to the arrangement order of the pixels in the ultra high definition images, followed by rearranging the pixels left after sampling, and obtaining a second frame of image, thus the two frames of image are formed.

The image processing system for laser TV, wherein, the ultra high definition image sequence transforming module further includes:

a re-segmentation unit, applied to segmenting the first frame of image and the second frame of image vertically, and obtaining the left and right sides of half pixels of the first and second frames of image, before forming two groups of two frames of image according to the arrangement order of the pixels in the ultra high definition image;

a sequence generation unit, applied to arranging the two groups of two frames of image formed from each frame of ultra high definition image into two series of image sequence, following the arrangement order of the ultra high definition image sequence.

The image processing system for laser TV, wherein, the ultra high definition image sequence display module further includes:

a processing signal generation unit, applied to processing the received first frame of image by two DMD driving chips respectively, before outputting the first image processing signal, and outputting a galvanometer synchronization signal at a high voltage; followed by processing the received second frame of image respectively, before outputting the second image processing signal, and outputting a galvanometer synchronization signal at a low voltage; at the same time of outputting the first and second image processing signals, outputting the color wheel control signal;

a display control unit, applied to controlling the light processing module by the color wheel control signal, to irradiate sequentially a plurality of color lights emitted by itself to the micro-mirror array of the DMD driving chip, the DMD driving chip turns on or off the micro-mirrors in the micro-mirror array, according to the first or second image processing signal, before converting the first or second frame of image into an image light, and projecting onto a screen for display.

The image processing system for laser TV, wherein, the ultra high definition image sequence display module further includes:

an image light processing unit, applied to projecting the image lights onto the screen for display, after passing through the spectroscopic/binocular prism, galvanometer and lens in turn;

when the galvanometer synchronization signal is at a high voltage, the galvanometer is locating at the first position, and it is the image light corresponding to the first frame of image projected onto the screen; when the galvanometer synchronization signal is at a low voltage, the galvanometer is locating at the second position, and it is the image light corresponding to the second frame of image projected onto the screen.

The image processing system for laser TV, wherein, the ultra high definition image sequence generation module comprises:

a TV signal processing unit, applied to processing the received TV signals in a turn of signals decoding, color gamut conversion, gamma correction, image noise reduction and enhancement, pixel resolution conversion and frame frequency conversion.

A laser TV set, wherein, it comprises the image processing system.

Benefits. The present invention provides an image processing method, system for laser TV and the laser TV set thereof, which receives a TV signal before converting into sequences of ultra high definition image; whose each image is then segmented and converted into two frames of images, and two series of ultra high definition image sequence are then obtained, which are then driven by two DMD driving chips and displayed in a time share and diagonal staggered way during a period satisfying a visual persistence. The method and system described in the present invention, utilizes a principle of visual persistence, and displays two frames of image segmented from a frame of ultra high definition image, in a way of time sharing, thus achieves a display of the ultra high definition images. Since images segmented from the ultra high definition images may be processed at a same time by two existing DMD driving chips being able to process FHD images, one image is displayed after another, and they are displayed at different positions on the screen at different time, thus the two frames of image will form one frame of ultra high definition image in a human's vision. The present invention owns a simple method, which utilizes an existing FHD element and achieves an ultra high definition display, it has a low cost and a wide application.

BRIEF DESCRIPTION OF THE DRAWINGS

FIG. 4 illustrates a flow chart on an image signal processing step in an embodiment of the image processing method described in the present invention;

DETAILED DESCRIPTION OF EMBODIMENTS

In order to make the purpose, technical solution and the advantages of the present invention clearer and more explicit, further detailed descriptions of the present invention are stated here, referencing to the attached drawings and some preferred embodiments of the present invention. It should be understood that the detailed embodiments of the invention described here are used to explain the present invention only, instead of limiting the present invention.

As a new generation of a TV product, a laser TV has stepped into our life because of a plurality of advantages including a bright color and a high brightness, as well as no radiation to human body. However, since even a DMD driving chip used in a highest resolution of an FHD (full high definition) TV in the prior arts may not satisfy a request on a resolution of an ultra high definition laser TV, thus a picture quality of an ultra high definition laser TV is an inherent shortness of itself. In order to solve a problem of how to achieve an ultra high definition image display in an ultra high definition laser TV, the present invention has provided an image processing method, details are listed below:

S1. receiving a TV signal, before converting into an ultra high definition image sequence.

The laser TV may receive TV signals input from outside through a signal interface, the TV signals include: a RF signal, an HDMI signal, a USB signal, a network signal and the like. After receiving the TV signals, a series of processes are applied to the TV signals, before being converted into the ultra high definition images sequences.

Specifically, after receiving the TV signals, a plurality of steps of processing the TV signals are as follows:

After the received TV signals are processed in a sequence of signals decoding, color gamut conversion, gamma correction, image noise reduction and enhancement, pixel resolution conversion and frame frequency conversion, the TV signals are converted into sequences of ultra high definition image, which belongs to a current technology and will not be described in details here.

S2. segmenting each frame of image in the sequences of ultra high definition image into two frames of images, and two series of image sequence will then be obtained, whose total pixel sum equals to that of the frame of ultra high definition image before segmentation.

Since the DMD driving chips in the prior arts are not able to being applied directly into converting the image signals in sequences of ultra high definition image, thus in the current step, segmenting and converting each frame of image in the ultra high definition image sequence into two frames of lower resolution images, to decrease its resolution and make it adapt to the DMD driving chips in the prior art.

Specifically, the step of segmenting and converting each frame of image in the ultra high definition image sequence into two frames of image, comprises:

with a sampling step of $\sqrt{2}$ pixel, taking pixel sampling to a frame of image in the sequences of ultra high definition image in both horizontal and vertical directions, before rearranging the image pixels obtained from pixel sampling, following the pixel arrangement order of the ultra high definition image, and obtaining the first frame of image, followed by rearranging the pixels left after sampling, and obtaining a second frame of image, thus the two frames of image are formed.

Figure 1:
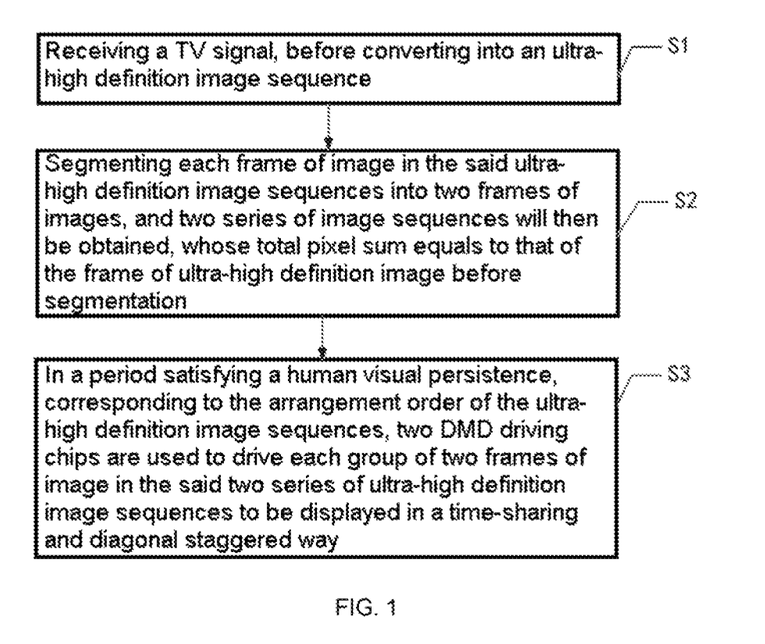
FIG. 1 illustrates a flowchart on an image processing method of an ultra high definition laser TV as provided in the present invention.
Figure 2:
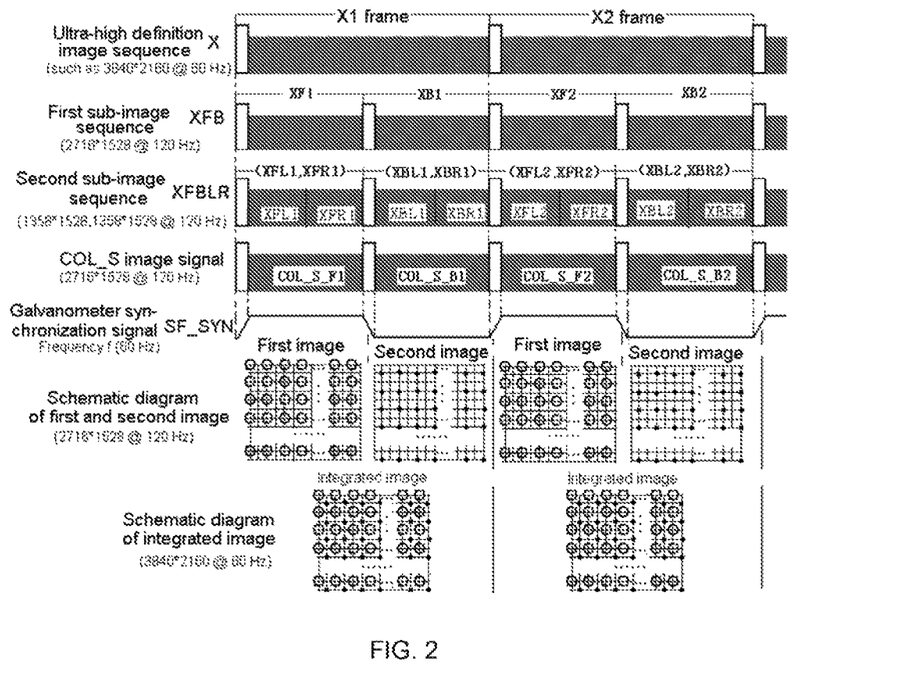
FIG. 2 illustrates a schematic diagram on an image signal processing step in an embodiment of the image processing method described in the present invention.

Since in the current step, the pixel sum of the two frames of image formed by segmentation and conversion should be equal to that of the original ultra high definition image for segmentation, thus adopting a sampling step of $\sqrt{2}$ pixel, and sampling in both horizontal and vertical directions of the ultra high definition images. For example: if the original ultra high definition image sequence is X{X1, X2, . . . , Xi, . . . , Xf}, a frame frequency of the sequence is f, combining with FIG. 2, a pixel matrix of the frame of image Xi is M*N, and each pixel is Xi (u*v); wherein, i is 1, 2, . . . , f, u is 1, 2, . . . , M, v is 1, 2, . . . , N. After taking samples from it, the obtained image pixels are rearranged following a pixel arrangement order of the original ultra high definition image, and a first frame of image XFi will be obtained, whose pixel is XFi(e*g), wherein e is 1, 2, . . . , $$\frac{1}{\sqrt{2}}M,$$

g is 1, 2, . . . , $$\frac{1}{\sqrt{2}}N,$$

and the pixels of XFi(e*g) are a part of the pixels of the frame of ultra high definition image Xi. After removing the above said pixels of Xi (u*v) from the frame of ultra high definition image Xi, rearranging the pixels left before generating a second frame of image XBi, whose pixel matrix is also $$\frac{1}{\sqrt{2}}M \times \frac{1}{\sqrt{2}}N,$$

thus two frames of images are obtained.

Since the pixels of an ultra high definition image are 3840*2160@60 Hz, after segmentations, it is converted into two frames of image with pixels of 2716*1528@120 Hz, while the pixels of an FHD are 1920*1080, thus, in the current technology, the DMD chip is still not able to be applied to process the above said two frames of image directly, thus, the current step further includes: dividing each of the two frames of image with the resolution of 2716*1528 into two parts of 1358*1528, since the pixel sum of 1358*1528 equals to that of an FHD of 1920*1080, thus, it may use two existing DMD driving chips being able to process an FHD image to process simultaneously two images of a resolution of 1358*1528. Therefore, before obtaining two series of ultra high definition image sequence, it further includes a step of:

Segmenting vertically the first frame of image and the second frame of image, respectively, before obtaining both left and right half pixels of the first and second frames of image, and, following an arrangement order of pixels in the ultra high definition image, two groups of two frames of image are formed.

Since each ultra high definition image sequence is segmented and converted into two groups of two frames of image, following the arrangement order of the ultra high definition image sequence, two groups of two frames of image formed from each frame of ultra high definition image are arranged into two series of ultra high definition image sequence.

S3. within a preset time, corresponding to the arrangement order of the sequences of ultra high definition image, two DMD driving chips are used to drive each group of two frames of image in the two series of ultra high definition image sequence to be displayed in a time-sharing and diagonal staggered way.

The preset period is a period satisfying a human visual persistence.

Since each frame of image in the ultra high definition image sequence is segmented and converted, the formed two series of image sequence may be signal conversion processed by the DMD driving chip in the current technology, thus in the period of visional persistence, the two groups of two frames of image after segmentation and conversion are displayed in a way of time sharing and diagonal staggered.

The step of two DMD driving chips applied to driving the two series of ultra high definition image sequence includes:

two DMD driving chips process a received first frame of image respectively, before outputting a first image processing signal, and outputting a galvanometer synchronization signal at a high voltage; followed by processing the received second frame of image respectively, before outputting a second image processing signal, and outputting the galvanometer synchronization signal at a low voltage; at the same time of outputting the first and second image processing signals, a color wheel control signal is output;

the color wheel control signal controls a light processing module to irradiate sequentially a plurality of color lights emitted by itself to a micro-mirror array of the DMD driving chip, the DMD driving chip turns on or off the micro-mirrors in the micro-mirror array according to the first or second image processing signal, before converting the first or second frame of image into an image light, and projecting onto a screen for display.

The DMD driving chip comprises a rectangular array composed by a plurality of mirror surfaces of micro-mirrors, it acts as mixing three primary color lights passing through the color wheel, before converting into a color image under a control.

Specifically, the DMD driving chips A and B process the received first frame of image or second frame of image, including: color adjustment, such as: gamut space conversion, GAMMA calibration and more, format conversion (since an input signal is a TTL signal, an input driving signal is an LVDS signal, thus, a format conversion is needed), together with extracting a frame synchronization information from the input signal, before converting into the galvanometer synchronization signal SF_SYN, as well as using the galvanometer synchronization signal SF_SYN to control the galvanometer.

After converting the first or second frame of image into the image light, it further includes:

the image lights are projected onto the screen for display, after passing through a spectroscopic/binocular prism, a galvanometer and a lens in turn; when the galvanometer synchronization signal is at a high voltage, the galvanometer is locating at a first position, then it is the image light corresponding to the first frame of image being projected onto the screen; when the galvanometer synchronization signal is at a low voltage, the galvanometer is locating at a second position, then it is the image light corresponding to the second frame of image being projected onto the screen.

Preferably, segmenting and converting each frame of image in the ultra high definition image sequence into two frames of image, is a common idea to a skilled personnel in the art, it may further segmenting and converting each frame of image in the ultra high definition image sequence into more than two frames of image, as long as the sum of the pixels of the multiple images after segmentation and conversion is the same as that of the ultra high definition image before segmentation and conversion, and when in displaying, it is needed to display the multiple images on the screen sequentially, in the period of visual persistence, according to the pixels arrangement order in the original ultra high definition image, so as to achieve a display of the ultra high definition image onto the screen.

Figure 3:
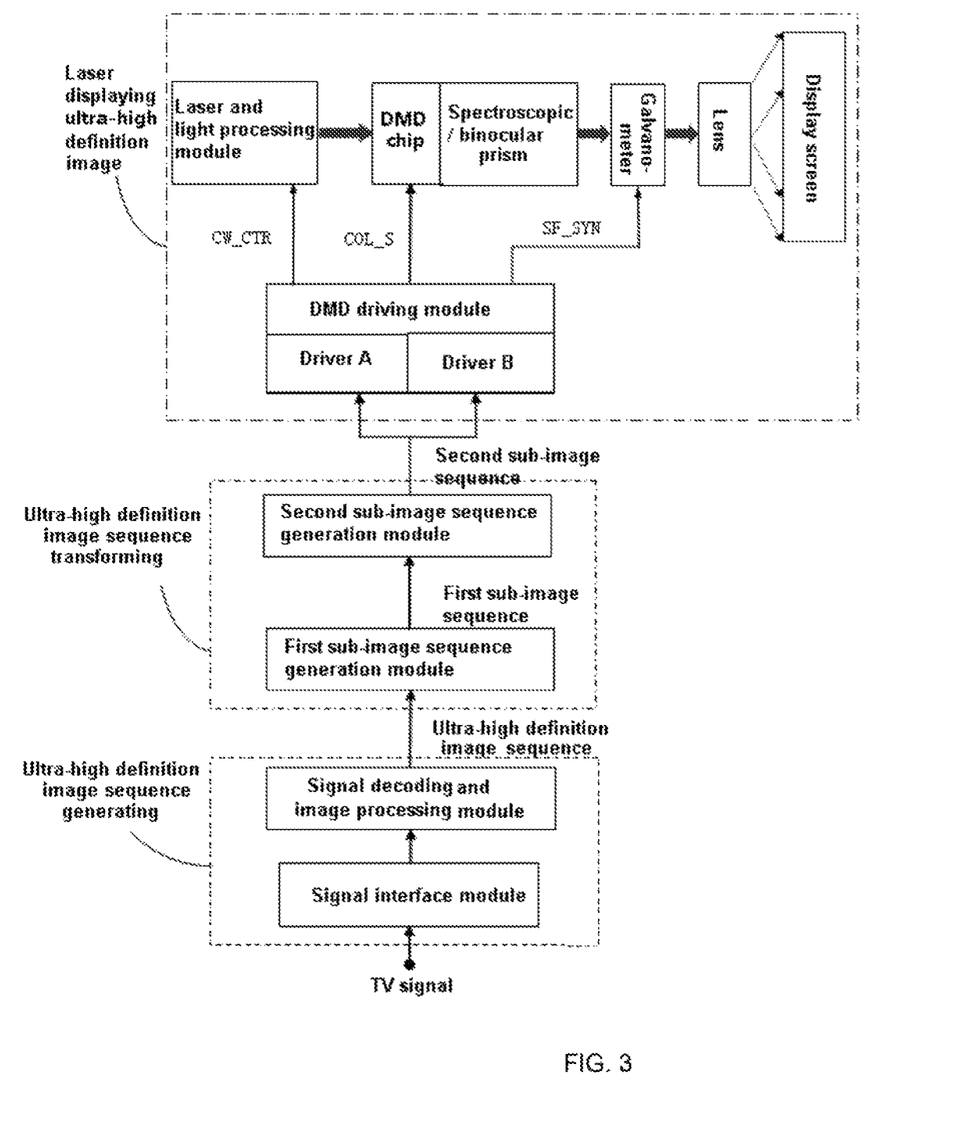
FIG. 3 illustrates a schematic diagram on an image signal processing method of the image processing method described in the present invention.

Further detailed descriptions on the above said method are stated in the following, referencing to FIGS. 2-4 and taking some embodiments on the methods in the present invention as examples:

Shown as FIG. 3, the present invention mainly includes three parts: an ultra high definition image sequence generation part, an ultra high definition image sequence transforming part and an ultra high definition image display part. The steps are shown in FIG. 4, including the following steps:

H1, receiving the TV signal, then a signal decoding and image processing module decodes the TV signal, followed by a plurality of processes of color gamut conversion, gamma correction, image noise reduction and enhancement, and more; then making pixel resolution conversion and frame frequency conversion, the received TV signals are converted into ultra high definition images Xi; and an ultra high definition image sequence is formed.

The ultra high definition images sequence generation part mainly includes a signal interface module, a signal decoding and image processing module. The signal interface module is applied to receiving the TV signals, including the RF signal, the HDMI signal, the USB signal, the network signal and the like. After receiving the TV signals, a signal decoding and image processing module is applied to decoding the TV signals, followed by a plurality of processes in a sequence, including color gamut conversion, gamma correction, image noise reduction and enhancement, and the like; then making pixel resolution conversion and frame frequency conversion, the received TV signals are converted into ultra high definition images Xi; and an ultra high definition image sequence X{X1, X2, . . . , Xi, Xf} is then generated, the frame frequency of the sequence X is f, as shown in a first line in FIG. 2. The pixel matrix of the ultra high definition image Xi is M*N, and each pixel is Xi (u*v); wherein, i is 1, 2, . . . , f, u is 1, 2, . . . , M, v is 1, 2, . . . , N.

Then the ultra high definition images Xi are sent to the ultra high definition images conversion part sequentially.

H2. with a sampling step of $\sqrt{2}$ pixel, taking pixel sampling to a frame of ultra high definition image Xi in both horizontal and vertical directions, and obtaining a first frame of image XFi, followed by rearranging the pixels left and obtaining a second frame of image XBi, both the first frame of image XFi and the second frame of image XBi are arranged sequentially, before composing a sequence, and the first sub-image sequence is then generated.

With a sampling step of $\sqrt{2}$ pixel, taking pixel sampling to a frame of ultra high definition image Xi in both horizontal and vertical directions, and obtaining a first frame of image XFi, whose pixel matrix is $$\frac{1}{\sqrt{2}} M \times \frac{1}{\sqrt{2}} N,$$

and the pixel of the first frame of image XFi is XFi(e*g), wherein, e is 1, 2, . . . , $$\frac{1}{\sqrt{2}}M,$$

g is 1, 2, . . . , $$\frac{1}{\sqrt{2}}N;$$

and the pixels of XFi(e*g) are part of the pixels of the ultra high definition frame of image Xi, and should satisfy $$e = \frac{1}{\sqrt{2}}u, g = \frac{1}{\sqrt{2}}v.$$

After removing the above said pixels Xi (u*v) from the ultra high definition frame of image Xi (wherein, $$e = \frac{1}{\sqrt{2}}u, g = \frac{1}{\sqrt{2}}v\Big),$$

rearranging the pixels left and generating the second frame of image XBi, whose pixel matrix is also $$\frac{1}{\sqrt{2}}M \times \frac{1}{\sqrt{2}}N,$$

the pixel of the second frame of image XBi is XBi(p*q), wherein, p is 1, 2, . . . , $$\frac{1}{\sqrt{2}}M,$$

q is 1, 2, . . . , $$\frac{1}{\sqrt{2}}N;$$

and the pixels of XBi(p*q) are part of the pixels of the ultra high definition frame of image Xi, and should satisfy $$p \neq \frac{1}{\sqrt{2}}u, q \neq \frac{1}{\sqrt{2}}v.$$

The first and second frames of image compose the first sub-image.

Preferably, the above said $$\frac{1}{\sqrt{2}}M, \frac{1}{\sqrt{2}}N, \frac{1}{\sqrt{2}}U, \frac{1}{\sqrt{2}}V$$

are taking a plurality of closest integers, while arranging the first frame of image XFi and the second frame of image XBi sequentially and composing a sequence, generating the first sub-image sequence XFB{XF1, XB1, XF2, XB2, . . . . XFi, XBi, . . . . XFf, XBf}, whose frame frequency is 2f, as shown in FIG. 2 and FIG. 3.

H3. Segmenting the first frame of image XFi and the second frame of image XBi vertically, converting the first frame of image XFi and the second frame of image XBi into a first sub-frame of image (XFLi, XFRi) and a second sub-frame of image (XBLi, XBRi), wherein, the XFLi and XFRi are the left half pixels and right half pixels of the first frame of image XFi, the XBLi and XBRi are the left half pixels and right half pixels of the second frame of image XBi; arranging sequentially the first sub-frame of image (XFLi, XFRi) and the second sub-frame of image (XBLi, XBRi) into a sequence, and generating the second sub-image sequence XFBLR{XFL1, XFR1), (XBL1, XBR1), (XFL2, XFR2), (XBL2, XBR2), . . . , (XFLi, XFRi), (XBLi, XBRi), . . . , (XFLf, XFRf), (XBLf, XBRf)}, whose pixel matrix is $$\Big(\frac{1}{2\sqrt{2}}M \times \frac{1}{\sqrt{2}}N, \frac{1}{2\sqrt{2}}M \times \frac{1}{\sqrt{2}}N\Big),$$

with a frame frequency of 2f, as shown in FIG. 2 and FIG. 3.

Sending the first sub-frame of image (XFLi, XFRi) and the second sub-frame of image (XBLi, XBRi) to a DMD driver sequentially, wherein, the XFLi (or XBLi) is sent to the DMD driver A, and the XFRi (or XBRi) is sent to the DMD driver B.

H4. The DMD driver A and driver B receive and process the first sub-frames of image (XFLi, XFRi) and the second sub-frames of image respectively, then output an image signal COL_S to control the micro-mirrors in the DMD chip, and outputting a galvanometer synchronization signal SF_SYN to control the position of the galvanometer as well as outputting a color wheel control signal CW_CTR to make the laser and light processing module provide color lights.

The DMD drivers A and B process the XFLi and XFRi simultaneously and respectively, and output COL_S_F as the image signal COL_S, as well as output the galvanometer synchronization signal SF_SYN at a high voltage; then the DMD drivers A and B process XBLi and XBRi simultaneously and respectively, and output COL_S_B as the image signal COL_S, as well as output the galvanometer synchronization signal SF_SYN at a low voltage; shown as FIG. 3. And at the same time of outputting the COL_S signal, the color wheel control signal CW_CTR is output.

H5. The DMD chip receives and processes the COL_S_F signal, turns the corresponding micro-mirrors in the micro-mirror array on the DMD chip on or off, and converts the COL_S_F signal into the image light; when the SF_SYN is at a high voltage, the galvanometer is at the first position, after passing through the spectroscopic/binocular prism, the galvanometer and lens, the image light is projected to a display screen before displaying the first image. Followed by the DMD chip receiving and processing the COL_S_B signal, turning the corresponding micro-mirrors in the micro-mirror array on the DMD chip on or off, and converting the COL_S_B signal into the image light; when the SF_SYN is at a low voltage, the galvanometer is at the second position, after passing through the spectroscopic/binocular prism, the galvanometer and lens, the image light is projected to the display screen before forming the second image. Both the first and the second image have a resolution of $$\frac{1}{\sqrt{2}}M \times \frac{1}{\sqrt{2}}N,$$

and a frequency of 2f.

The CW_CTR signal controls the laser and the light processing module to irradiate the color lights to the micro-mirror array in the DMD chip; the DMD chip turns on or off the micro-mirrors in the micro-mirror array corresponding to the image signal pixels, based on the image signal COL_S_F, and converts the image signal into the image light, when the SF_SYN is at a high voltage, the galvanometer is at the first position, after passing through the spectroscopic/binocular prism, the galvanometer and lens, the image light is projected to the display screen before displaying the first image, shown as FIG. 2. The first image displayed is corresponding to the second sub-frame of image (XFLi, XFRi), or the first sub-frame of image XFi, and displays a content of half pixels of the ultra high definition frame of image Xi, whose resolution is $$\frac{1}{\sqrt{2}}M \times \frac{1}{\sqrt{2}}N,$$

followed by the DMD chip turning on or off the micro-mirrors in the micro-mirror array corresponding to the image signal pixels, based on the image signal COL_S_B, and converting the image signal into the image light, when the SF_SYN is at a low voltage, the galvanometer is at the second position, after the passing through the spectroscopic/binocular prism, the galvanometer and lens, image light is projected to the display screen before displaying the second image. The second image displayed is corresponding to the second sub-frame of image (XBLi, XBRi), or the first sub-frame of image XFi, and displays a content of another half pixels of the ultra high definition frame of image Xi, whose resolution is also $$\frac{1}{\sqrt{2}}M \times \frac{1}{\sqrt{2}}N.$$

The displayed first and second images are at a diagonal staggered position on the screen, as shown in FIG. 2.

H6. The first and second images formed on screen enter a human's vision sequentially, according to the principle of visual persistence, both the first and the second images will be combined into one ultra high definition image with a resolution of M*N, and a frequency of f.

The following descriptions are stated by taking an ultra high definition frame of image Xi with a pixel matrix of 3840*2160 and a frame frequency of 60 Hz as an example.

Converting the received TV signals into the frame of ultra high definition image Xi, and generating an ultra high definition image sequence X{X1, X2, . . . , Xi, . . . , X60}, i.e., the frame frequency is 60 Hz; the pixel matrix of the frame of image Xi is 3840*2160, each pixel is Xi(u*v); wherein, i is 1, 2, . . . , 60, u is 1, 2, . . . , 3840, v is 1, 2, . . . , 2160. Then the frame of ultra high definition image sequence is denoted as $X_{3840 \cdot 2160}$@60 Hz, and the ultra high definition image is denoted as $Xi_{3840*2160}$.

With a sampling step of $\sqrt{2}$ pixel, taking pixel sampling to a frame of ultra high definition image $Xi_{3840*2160}$ in both horizontal and vertical directions, and obtaining a first sub-frame of image XFi, with a frame frequency of 60 Hz, whose pixel matrix is 2716*1528, and the pixel is XFi(e*g)= Xi(u*v), wherein, e is 1, 2, . . . , 2716, g is 1, 2, . . . , 1528, and $$e = \frac{1}{\sqrt{2}}u, \, g = \frac{1}{\sqrt{2}}v$$

should be satisfied. Similarly, the first frame of image XBi is achieved, with a frame frequency of 60 Hz, whose pixel matrix is also 2716*1528, and the pixel is XBi(p*q)=Xi (u*v), wherein, e is 1, 2, . . . , 2716, g is 1, 2, . . . , 1528, and $$p \neq \frac{1}{\sqrt{2}}u, \, q \neq \frac{1}{\sqrt{2}}v$$

should be satisfied. The above $$\frac{1}{\sqrt{2}}M, \, \frac{1}{\sqrt{2}}N, \, \frac{1}{\sqrt{2}}U, \, \frac{1}{\sqrt{2}}V$$

are taking the closest integers.

Arranging the first frame of image XFi and the second frame of image XBi sequentially and composing a sequence, generating the first image sequence XFB{XF1, XB1, XF2, XB2, . . . , XFi, XBi, . . . , XF60, XB60}, whose frame frequency is 120 Hz. Then the first sub-image sequence is denoted as $XFB_{2716*1528}$@120 Hz, the first frame of image is denoted as $XFi_{2716*1528}$ and the second frame of image as $XBi_{2716*1528}$.

After segmenting the first frame of image $XFi_{2716*1528}$ and the second frame of image $XBi_{2716*1528}$ vertically, converting the $XFi_{2716*1528}$ and $XBi_{2716*1528}$ into the first sub-frame of image (XFLi, XFRi) and the second sub-frame of image (XBLi, XBRi) respectively, wherein, the XFLi and XFRi are the left half pixels and the right half pixels of the first frame of image XFi respectively, the XBLi and XBRi are the left half pixels and the right half pixels of the second frame of image XBi respectively, the pixel matrixes of XFLi and XFRi, XBLi and XBRi are all 1358*1528; arranging sequentially the first sub-frame of image (XFLi, XFRi) and the second sub-frame of image (XBLi, XBRi) into the sequence, before generating the second sub-image sequence XFBLR{(XFL1, XFR1), (XBL1, XBR1), (XFL2, XFR2), (XBL2, XBR2), . . . , (XFLi, XFRi), (XBLi, XBRi), . . . , (XFLf, XFRf), (XBLf, XBRf)}, whose frame frequency is 120.

The DMD drivers A and B in the DMD driving module process the $XFLi_{1358*1528}$ and $XFRi_{1358*1528}$ simultaneously and respectively, before outputting the image signals COL_S_FL and COL_S_FR, whose pixel matrixes are both 1358*1528, as well as outputting the galvanometer synchronization signal SF_SYN at a high voltage, and outputting the color wheel control signal CW_CTR. The CW_CTR signal controls the laser and the light processing module to irradiate the color lights to the micro-mirror array in the DMD chip sequentially, both the image signals COL_S_FL and COL_S_FR control simultaneously the 2716*1528 micromirrors in the micro-mirror array in the DMD chip to turn on or off, and convert the image signal into the image light; while the SF_SYN is at a high voltage and the galvanometer locates at the first position; after passing through the spectroscopic/binocular prism, the galvanometer and lens, the image light is projected to the display screen before displaying the first image. The resolution of the displayed first image is 2716*1528, and the display frequency is 120 Hz.

Then the DMD drivers A and B process the $XBLi_{1358*1528}$ and $XBRi_{1358*1528}$ simultaneously and respectively, before outputting the image signals COL_S_BL and COL_S_BR, whose pixel matrixes are both 1358*1528, as well as outputting the galvanometer synchronization signal SF_SYN at a low voltage, and the galvanometer locates at the second position; after passing through the spectroscopic/binocular prism, the galvanometer and lens, the converted image light under a control of COL_S_BL and COL_S_BR is projected to the display screen before displaying the second image. The resolution of the displayed second image is also 2716*1528, and the display frequency is also 120 Hz.

The above first and second images displayed on the screen are locating in the diagonal staggered positions without any overlapping, whose resolutions are both 2716*1528. Since the first image and the second image displayed on the screen are entering a human's vision sequentially, and according to the principle of visional persistence, the first and second images will be combined together before being displayed as a whole image, whose resolution is 3840*2160, and display frequency is 60 Hz, thus a display of the ultra high definition image is achieved.

The present invention has provided an image processing method, system for laser TV and the laser TV set thereof, through converting an ultra high definition image, one frame of the ultra high definition image is converted into two frames of image, while keeping the pixel sum unchanged. Further, one frame of image is segmented into two parts, and a number of the pixels of each segmented part equals to that of an FHD image, thus two DMD driving chips being able to process the FHD image may be used to process and drive the DMD chip, before achieving a display of one frame of image; and, following the same principle, another frame of image is also displayed in a time sharing way. As well as adopting the galvanometer, which is controlled in a synchronizing way, the two frames of image are displayed at different positions on the screen, while their pixels are in the diagonal staggered positions. By using the principle of visual persistence, the two displayed time-sharing frames are combined into one frame of ultra high definition image, and a display of an ultra high resolution image is achieved. (for example, one frame of ultra high definition image with the pixels of 3840*2160@60 Hz, is converted into two frames of image with the pixels of 2716*1528@120 Hz, keeping the number of the pixels unchanged. The image of 2716*1528 is further segmented into two parts of 1358*1528, each part has a same pixel sum as that of an FHD of 1920*1080, thus it is possible to use two existing DMD driving chips being able to process an FHD image to process simultaneously two images with the resolution of 1358*1528, and one of the two frames is displayed; and at another time point, another frame is displayed. The two frames are displayed at different positions on the screen in a time-sharing way, that is, 2716*1528@120 Hz; due to the visual persistence, two frames of 2716*1528 are combining together before generating a frame of image at 3840*2160, thus, an ultra high definition image display is achieved, i.e., achieving a display of 3840*2160@60 Hz). The present invention owns a simple method, by utilizing an existing FHD element to achieve an ultra high definition display, and has a low cost and a wide application, having a great application value.

Figure 5:
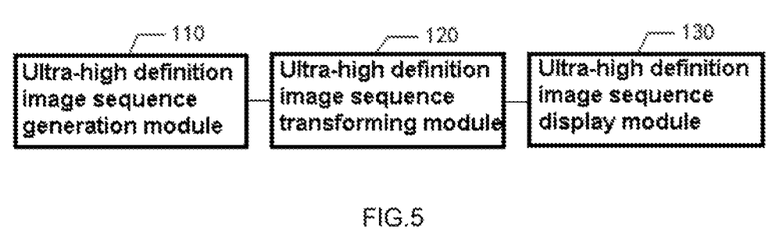
FIG. 5 illustrates a schematic diagram of the image processing system provided in the present invention.

According to the above image processing method for laser TV, the present invention has further provided an image processing system for laser TV, as shown in FIG. 5, the image processing system includes:

an ultra high definition image sequence generation module 110, applied to receiving a TV signal, and converting into an ultra high definition image sequence. Whose function is as what is stated in the above said step S1.

an ultra high definition image sequence transforming module 120, applied to segmenting each frame of image in the sequences of ultra high definition image into two frames of image, before two series of image sequence are obtained, the total pixel sum of the two frames of image equals to that of the frame of ultra high definition image before segmentation. Whose function is as what is stated in the above said step S2.

an ultra high definition image display module 130, applied to using two DMD driving chips to drive each group of two frames of image in the two sequences of image to be displayed in a time-sharing and diagonal staggered way; whose function is as what is stated in the above said step S3.

The ultra high definition image sequence transforming module 120 comprises: a sampling and segmentation unit, applied to taking pixel sampling to a frame of ultra high definition image in both horizontal and vertical directions, with a sampling step of $\sqrt{2}$ pixel, before obtaining a first frame of image after rearranging the image pixels obtained from pixel sampling corresponding to the arrangement order of the pixels in the ultra high definition image, followed by rearranging the pixels left and obtaining a second frame of image, thus forming the two frames of image.

The ultra high definition image sequence transforming module 120 further comprises:

a re-segmentation unit, applied to segmenting the first and second frames of image vertically, and obtaining the left and right sides of half pixels of the first and second frames of image, before forming two groups of two frames of image according to the arrangement order of the pixels in the ultra high definition image;

a sequence generation unit, applied to arranging the two groups of two frames of image formed from each frame of ultra high definition image into two sequences of image, following the arrangement order of the ultra high definition image sequence.

The ultra high definition image display module further includes:

a processing signal generation unit, applied to processing the received first frame of image by two DMD driving chips respectively, before outputting the first image processing signal, and outputting the galvanometer synchronization signal at a high voltage; followed by processing the received second frame of image respectively, before outputting the second image processing signal, and outputting the galvanometer synchronization signal at a low voltage; at the same time of outputting the first and second image processing signals, the color wheel control signal is output;

a display control unit, applied to controlling the light processing module by the color wheel, to irradiate sequentially a plurality of color lights it emits to the micro-mirror array of the DMD driving chip, the DMD driving chip turns on or off the micro-mirrors in the micro-mirror array, according to the first or second image processing signal, before converting the first or second frame of image into an image light, and projecting to a screen for display.

The ultra high definition image display module, further includes:

an image light processing unit, applied to projecting the image lights to the screen for display, after passing through the spectroscopic/binocular prism, galvanometer and lens in turn;

when the galvanometer synchronization signal is at a high voltage, the galvanometer is locating at the first position, and it is the image light corresponding to the first frame of image projected onto the screen; while the galvanometer synchronization signal is at a low voltage, the galvanometer is locating at the second position, and it is the image light corresponding to the second frame of image projected onto the screen.

The ultra high definition image sequence generation module comprises:

a TV signal processing unit, applied to processing the received TV signals in a turn of signals decoding, color gamut conversion, gamma correction, image noise reduction and enhancement, pixel resolution conversion and frame frequency conversion.

On a basis of the above said image processing method, system for laser TV, the present invention further provides a laser TV set, wherein, it comprises: the image processing system for displaying images after the ultra high definition processions with the above said image processing method.

The present invention provides an image processing method, system for laser TV and the laser TV set thereof, which receives a TV signal before converting into an ultra high definition image sequence; whose each frame of image is then segmented and converted into two frames of image, before obtaining two sequences of image, and, the pixel sum of the two frames of image equals to that of the one ultra high definition image before segmentation; within a preset time period, following the arrangement order of the sequences of ultra high definition image, using two DMD driving chips to drive the two sequences of image to be displayed in a time-sharing and diagonal staggered way. The method and system described in the present invention, utilizes the principle of visual persistence, and displays two frames of image segmented from a frame of ultra high definition image, in a way of time-sharing, thus achieves a display of the ultra high definition image. Since images segmented and converted from the ultra high definition image may be processed at the same time by two existing DMD driving chips being able to process FHD images, one image will be displayed after another, and they are displayed at different positions on the screen at different time, thus the two frames of image will form one frame of ultra high definition image in a human's vision. The present invention owns a simple method of utilizing the existing FHD elements and achieves an ultra high definition display, which has a low cost and a wide application.

It should be understood that, the application of the present invention is not limited to the above examples listed. Ordinary technical personnel in this field can improve or change the applications according to the above descriptions, all of these improvements and transforms should belong to the scope of protection in the appended claims of the present invention.

What is claimed is:

1. An image processing system for a laser TV comprising:
a memory; and
a processor coupled to the memory, wherein the processor is configured to:
receive a TV signal;
sequentially perform a signal decoding, a color gamut conversion, a gamma correction, an image noise reduction and enhancement, a pixel resolution conversion and a frame frequency conversion to convert the TV signal into an ultra high definition image sequence;
segment a frame of an ultra high definition image having 3840*2160 pixels in the ultra high definition image sequence into a first image and a second image having 2716*1528 pixels, wherein a total pixel sum of the first image and the second image equals to a pixel sum of the ultra high definition image;
vertically segment the first image to obtain a first left half image and a first right half image having 1358*1528 pixels of the first image, and vertically segment the second image to obtain a second left half image and a second right half image having 1358*1528 pixels of the second image, wherein the first left half image and the first right half image of the first image and the second left half image and the second right half image of the second image are obtained based on an arrangement order of pixels in the ultra high definition image;
use two full high definition Digital Micromirror Device (DMD) driving chips configured to process 1920*1080 pixels to sequentially drive the first left half image, the first right half image, the second left half image and the second right half image following the arrangement order of pixels in the ultra high definition sequence, so that the ultra high definition image sequence is processed by the two full high definition DMD driving chips.

2. The image processing system for the laser TV according to claim 1, wherein, the processor is further configured to:
sample the frame of the ultra high definition image in both horizontal and vertical directions, with a sampling step of $\sqrt{2}$ pixel, and obtain the first image after rearranging a sampled image pixels according to the arrangement order of the pixels in the ultra high definition image, and rearrange the pixels left after sampling to obtain the second image.

3. The image processing system for the laser TV according to claim 1, wherein the processor is further configured to:
arrange the first left half image and the first right half image of the first image and the second left half image and the second right half image of the second image into two series of image sequences based on the arrangement order of the ultra high definition image sequence.

4. The image processing system for the laser TV according to claim 3, wherein, processor is further configured to:
process the first left half image and the first right half image of the first image by the two DMD driving chips respectively, and output a galvanometer synchronization signal at a first voltage;
process the second left half image and the second right half image of the second image respectively, and output a galvanometer synchronization signal at a second voltage; and output a color wheel control signal;

control, based on the color wheel control signal, to sequentially irradiate a plurality of color lights emitted by the light processing module to a micro-mirror array of the DMD to turn on or off the micro-mirrors in the micro-mirror array and convert the first or second image into an image light.

5. The image processing system for the laser TV according to claim 4, wherein, the processor is further configured to:

project the image light onto a screen for display, after passing through a spectroscopic/binocular prism, a galvanometer and a lens sequentially;

when the galvanometer synchronization signal is at the first voltage, the galvanometer is locating at a first position; when the galvanometer synchronization signal is at the second voltage, the galvanometer is locating at a second position.

6. The image processing system for the laser TV according to claim 4, wherein, the processor is further configured to:

process the received TV signals in a turn of a signals decoding, a color gamut conversion, a gamma correction, an image noise reduction and enhancement, a pixel resolution conversion and a frame frequency conversion.

* * * * *